(No Model.) 4 Sheets—Sheet 3.
J. P. SMITH & W. C. EVANS.
NAILING MACHINE.
No. 376,114. Patented Jan. 10, 1888.
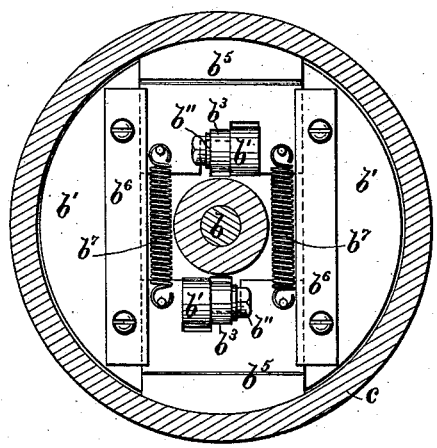
Fig. 6.
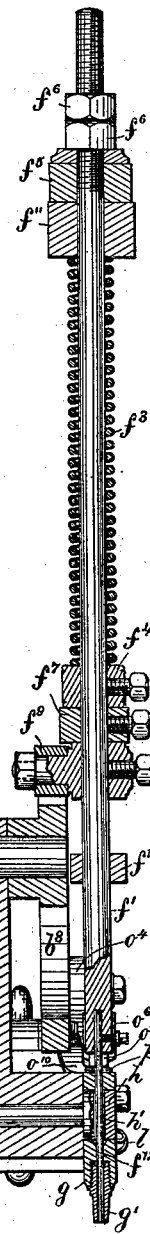
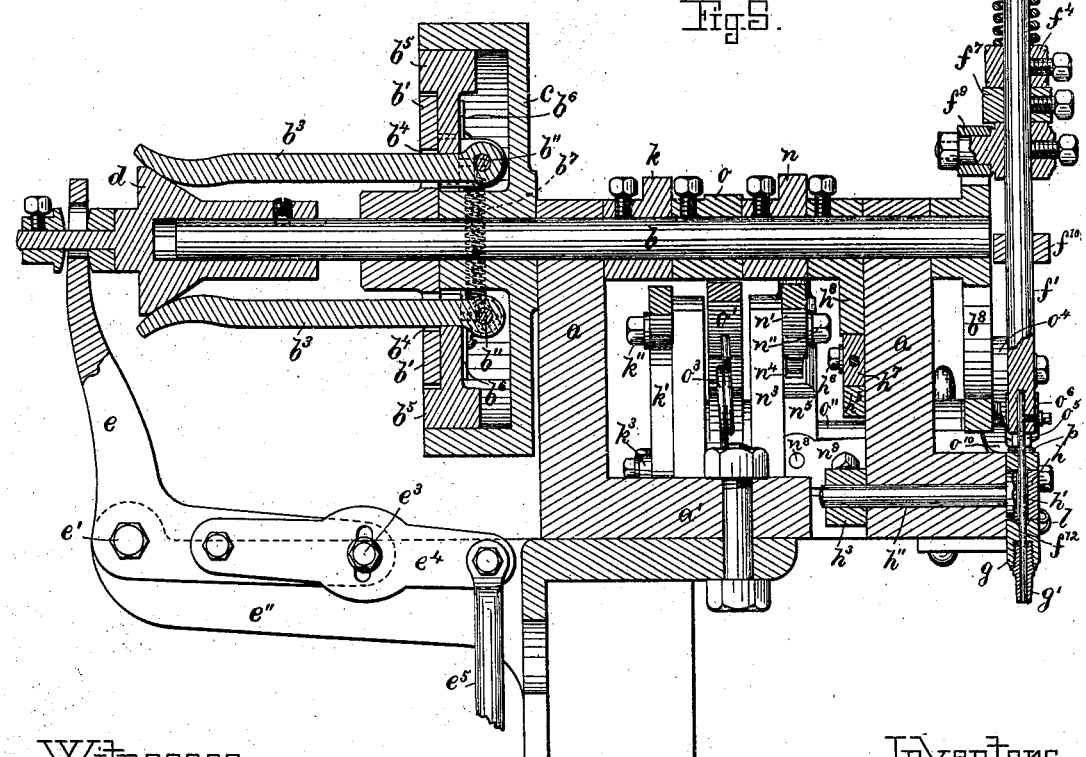
Fig. 5.
Witnesses
Henry Chadbourn.
Charles H. Figg.
Inventors
John P. Smith and Warren C. Evans.
by Alban Andrew their atty.

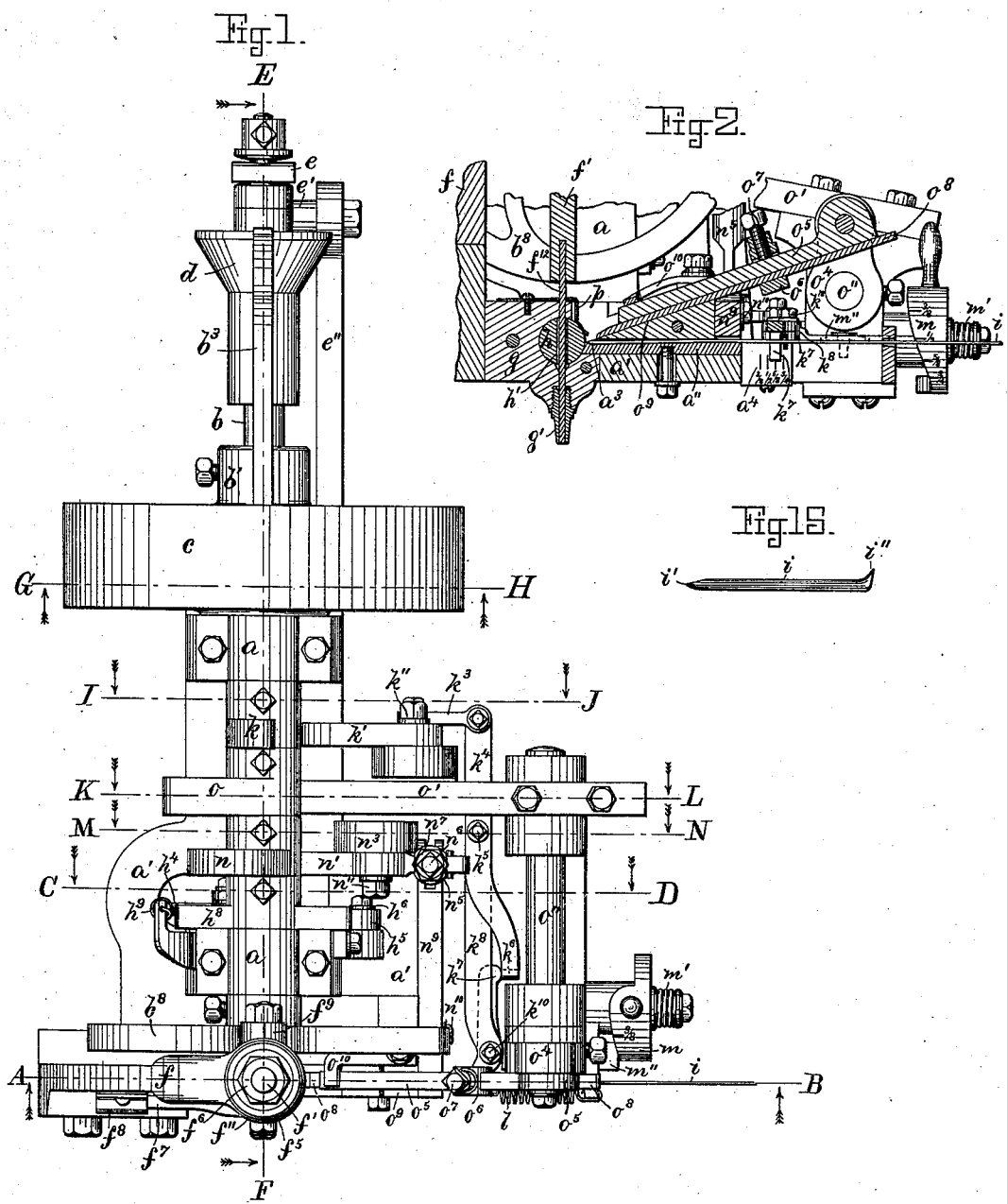

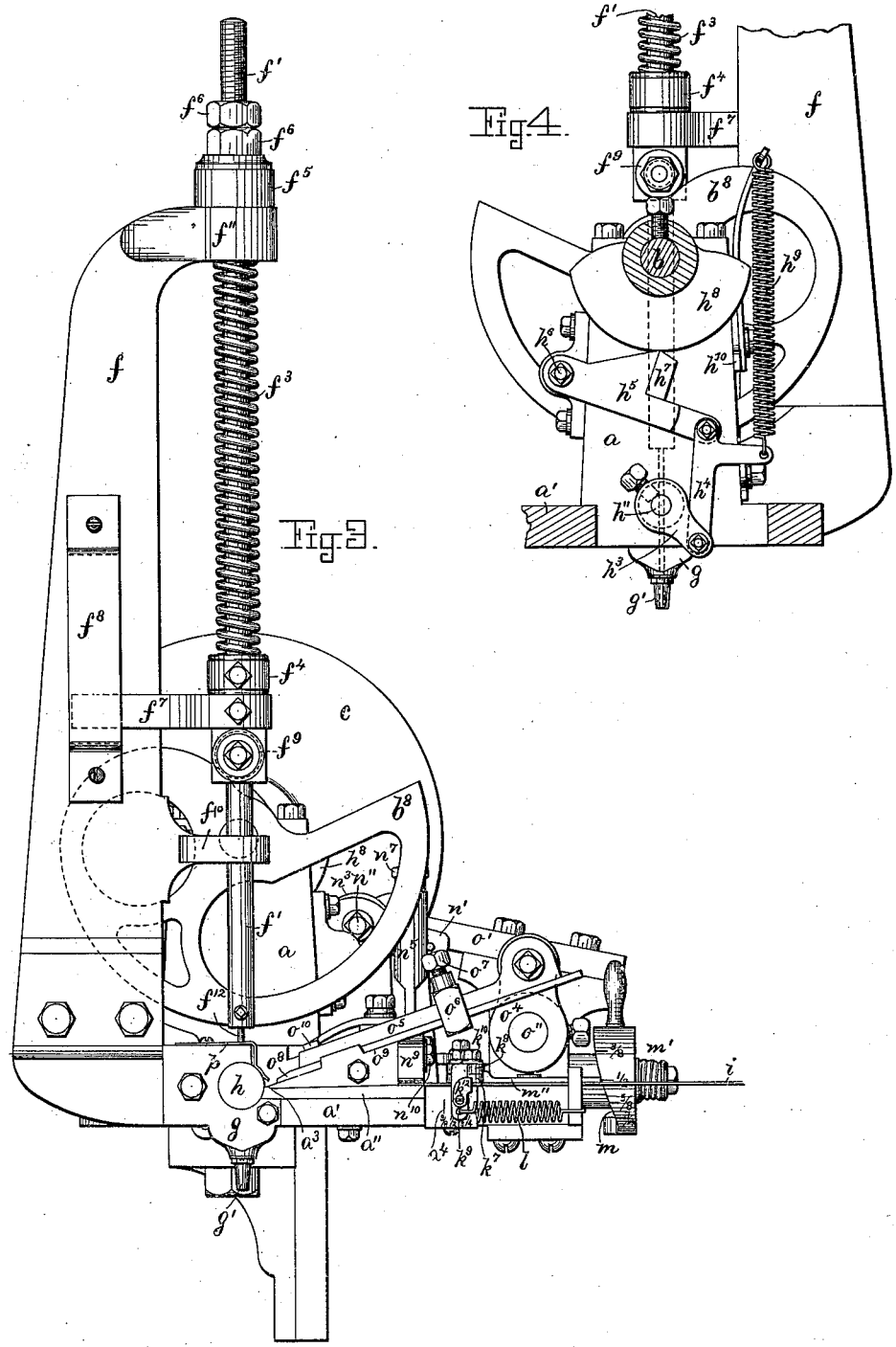

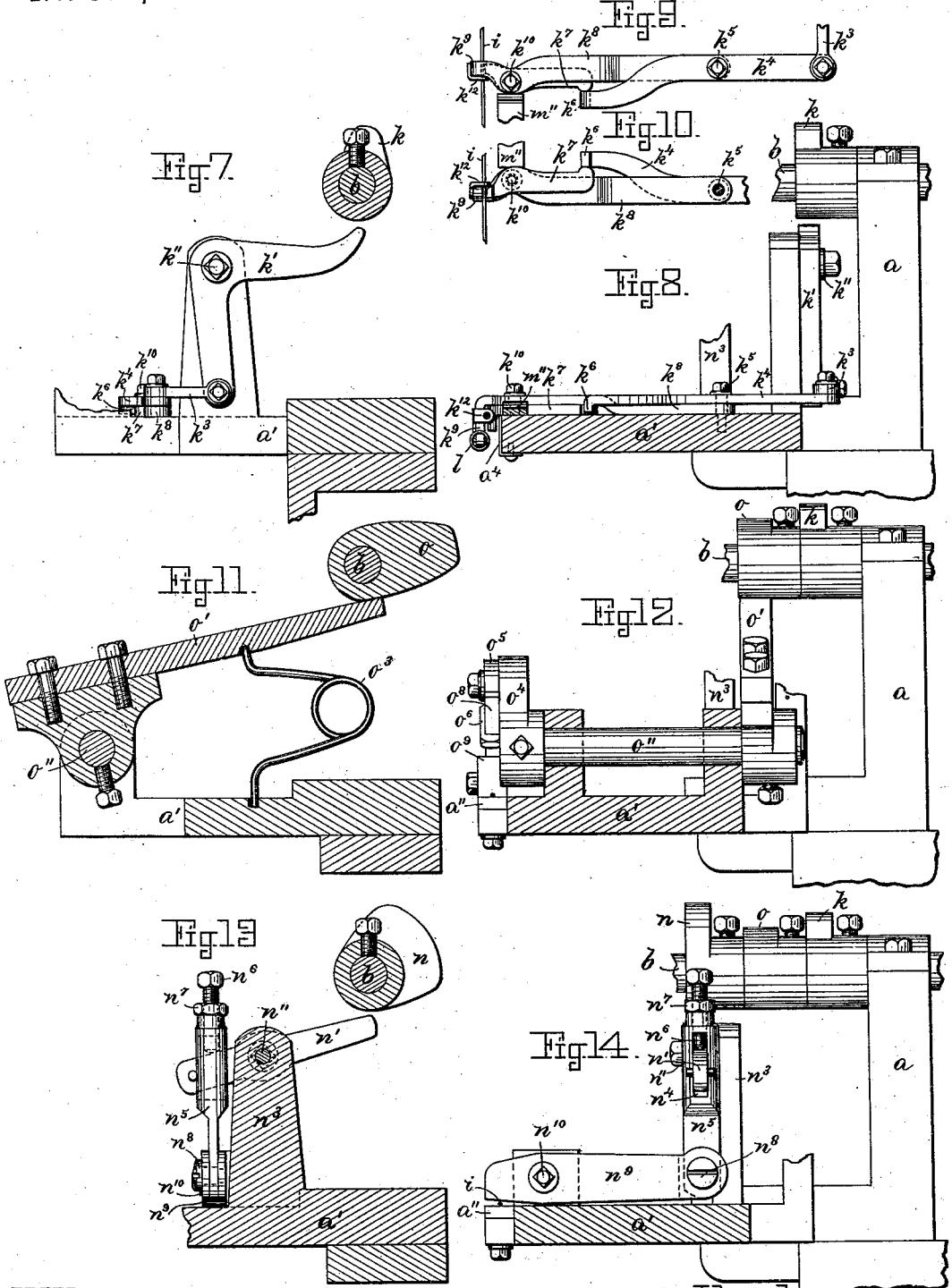

UNITED STATES PATENT OFFICE.

JOHN P. SMITH AND WARREN C. EVANS, OF EXETER, NEW HAMPSHIRE.

NAILING-MACHINE.

SPECIFICATION forming part of Letters Patent No. 376,114, dated January 10, 1888.

Application filed August 18, 1887. Serial No. 247,262. (No model.)

*To all whom it may concern:*

Be it known that we, JOHN P. SMITH and WARREN C. EVANS, citizens of the United States, and residents of Exeter, in the county of Rockingham and State of New Hampshire, have jointly invented new and useful Improvements in Nailing-Machines, of which the following, taken in connection with the accompanying drawings, is a specification.

This invention relates to improvements in nailing-machines of that kind in which a wire is fed by automatic mechanism from a reel or other suitable supply, and after being pointed, headed, and severed the nail is driven by mechanism, as will hereinafter be more fully shown and described, reference being had to the accompanying drawings, where—

Figure 1 represents a plan view of the machine. Fig. 2 represents a cross-section on the line A B, shown in Fig. 1. Fig. 3 represents a front elevation of the machine. Fig. 4 represents a cross-section on the line C D, shown in Fig. 1. Fig. 5 represents a central longitudinal section on the line E F, shown in Fig. 1. Fig. 6 represents a cross section of the friction-clutch on the line G H in Fig. 1. Fig. 7 represents a cross section on the line I J in Fig. 1, showing the mechanism for operating the feed, and Fig. 8 is a side elevation of the same. Figs. 9 and 10 represent, respectively, top and bottom views of the nippers for feeding the wire. Fig. 11 represents a cross-section on the line K L in Fig. 1, showing the mechanism for operating the shears, and Fig. 12 represents a side view of the same. Fig. 13 represents a cross-section on the line M N in Fig. 1, showing the gripping mechanism for holding the wire while it is being sheared, and Fig. 14 is a side view of the same; and Fig. 15 represents an enlarged side view of the finished wire nail.

Similar letters refer to similar parts wherever they occur on the different parts of the drawings.

$a\ a$ represent the head of the machine, in the upper end of which is journaled the driving-shaft $b$, as shown in Fig. 5. On the shaft $b$ is loosely journaled the driving-pulley $c$, provided with a friction-clutch mechanism, as shown in Figs. 1, 5, and 6, for connecting the pulley $c$ to the shaft $b$ when the machine is to be operated. A rotary motion is imparted to the pulley $c$ by means of belt-power, as usual. Back of the pulley $c$ is firmly secured to the shaft $b$ the disk $b'$, to the front of which are pivoted at $b''\ b''$ the levers $b^3\ b^3$, which latter, after passing through slots $b^4\ b^4$ in the disk $b'$, project rearwardly, as shown in Figs. 1 and 5.

On the shaft $b$, at its rear end, is splined the cone $d$, that is adapted to move forward and back on the end of the shaft $b$, it having for this purpose connected to its rear end the upper end of the bell-crank lever $e$, that is hung at $e'$ on the bracket $e''$, secured to the head $a\ a$, as shown in Fig. 5. To the said bell-crank lever is secured, preferably in an adjustable manner, by means of the set-screw $e^3$, the lever $e^4$, to which is hinged or suitably connected the treadle-rod $e^5$, having its lower end connected to a treadle, such being, however, not shown in the drawings, as such treadle-connection is well known in the art. When the rod $e^5$ is pulled downward, the bell-crank lever $e$ is tripped, causing the cone $d$ to move forward on the shaft $b$, and in so doing it expands the levers $b^3\ b^3$, by which the friction-blocks $b^5\ b^5$ are forced outward against the inner periphery of the pulley $c$, causing the latter to be, for the time being, connected to the shaft $b$ by the medium of the disk $b'$, and thus imparting a rotary motion to the shaft $b$. The friction-blocks $b^5\ b^5$ are free to move in guides $b^6\ b^6$ on the disk $b'$, as shown in Fig. 6.

$b^7\ b^7$ are springs connecting the friction-blocks $b^5\ b^5$, as shown in Figs. 5 and 6, for the purpose of automatically releasing said friction-blocks from the pulley $c$ when the cone $d$ is moved backward on the shaft $b$.

To the forward part of the head $a$ is secured the stationary guide $f$ for the driver-bar $f'$, the latter passing through the perforated eye $f''$ in the upper end of the said guide $f$, as shown in Figs. 3 and 5. On the driver-bar $f'$ is located a coiled spring, $f^3$, between the collar $f^4$, secured to the driver-bar, and the under side of the eye $f''$, which spring forces the driver-bar downward when released by the cam that raises it. Above the eye $f''$ is located, as usual, a suitable yielding bunter, $f^5$, and on the upper end of the driver-bar are screwed the check-nuts $f^6\ f^6$, to limit the downward stroke of said driver-bar, as is common in machines of this kind.

$f^7$ is an arm or projection secured to the driver-bar $f'$, and adapted to move up and down in a guide-piece, $f^8$, secured to the guide or standard $f$, as shown in Fig. 3, to prevent the driver-bar from turning around its axis when it is moved up and down, and thereby retaining its pin and roll in the proper position relative to the lifting-cam.

$f^9$ is the pin and roll secured to the driver-bar $f'$, and $b^8$ is the lifting-cam secured to the shaft $b$, for the purpose of raising the driver-bar $f'$ against the influence of the spring $f^3$, as is usual in nail-driving machines.

$f^{10}$ is a projection on the guide $f$, through which the driver-bar $f'$ passes, and in which it is guided in its lower end, as shown in Figs. 3 and 5.

$f^{12}$ is the driver secured in the lower end of the driver-bar $f'$, as usual.

To the front of the head $a$ is secured the nail-tube block $g$, having a vertical perforation arranged centrally in a line below the driver $f^{12}$, to allow the latter to work up and down in such perforation.

$g'$ is the nail-tube, secured to the lower end of the block $g$, as shown in Fig. 5. The block $g$ has a horizontal circular perforation, in which is located the oscillating nail-deliverer $h$, having a perforation, $h'$, through which the driver passes when the nail is being driven, and during such operation the said nail-deliverer remains stationary in the position as shown in Figs. 2 and 5. After the nail has been driven, and while the driver is in its upper position, the nail-deliverer $h$ is oscillated so as to receive the end of the wire, $i$, from which the nails are made, and after said wire has been cut off the required length and headed to form the nail the deliverer $h$ is automatically returned to its original position, (shown in Figs. 2 and 5,) with the nail within its perforation ready to be driven when the driver descends.

The automatic mechanism for oscillating the deliverer $h$ is carried out as follows: In one piece with or attached to the part $h$ is made the horizontal shaft $h''$, (shown in Figs. 4 and 5,) that is located in a bearing in the head $a$ and has secured to its rear end the lever $h^3$, to the end of which is pivoted the link $h^4$, as shown in Fig. 4. The upper end of the link $h^4$ is connected to the lever $h^5$, that is pivoted at $h^6$ to the head $a$ or to a bearing secured to it, said lever being preferably provided with a hardened-steel face, $h^7$, Fig. 4, on which acts the cam $h^8$, secured to the driving-shaft $b$, to depress the lever $h^5$, and thus turn the deliverer $h$ in one direction. When the cam $h^8$ ceases to act on said lever $h^5$, the deliverer $h$ is automatically turned in the opposite direction for receiving the nail by the influence of the spring $h^9$, the upper end of which is secured to the head $a$ or a projection thereon, and the lower end of which is secured to the link $h^4$ or a projection thereon, as shown in Fig. 4. $h^{10}$ is a projection on the head $a$, and it serves as a stop to limit the upward motion of the link $h^4$ and its connections, as shown in said Fig. 4.

The mechanism for intermittently feeding the wire into the perforated nail-deliverer is constructed as follows:

To the driving-shaft $b$ is secured the cam $k$, which operates a knee-lever, $k'$, pivoted at $k''$ to a post or projection on the plate $a'$, that forms the base or extension of the head $a$, as shown in Figs. 7 and 8.

$k^3$ is a link pivoted in one end to the lower end of the knee-lever $k'$ and in the other end to the rear end of the nipper-lever $k^4$. (Shown in Figs. 1, 8, 9, and 10.) The lever $k^4$ is pivoted at $k^5$ to the plate $a'$, and has a downwardly-bent tooth or projection, $k^6$, in its forward end, which is in contact with the dog $k^7$ (that is pivoted to the nipper-lever $k^8$) when the cam $k$ acts on the knee-lever $k'$. The rear end of the nipper-lever $k^3$ is also pivoted at $k^5$, and said lever has in its forward end a lip or jaw, $k^9$, between which and the outer end of the dog $k^7$ the wire $i$ is nipped by the action of the cam $k$ on the knee-lever $k'$. The dog $k^7$ is pivoted at $k^{10}$ to the nipper-lever $k^8$ near its outer end, as shown in Figs. 1, 8, 9, and 10. The wire to be fed between the nippers is guided by passing through a perforated guide-piece, $k^{12}$, secured to or made in one piece with the nipper-lever $k^8$, as shown in Figs. 8, 9, and 10.

The operation of the wire-feed device is as follows: When the cam $k$ actuates the knee-lever $k'$, it causes the front end of the lever $k^4$ to move in the direction of the feed, and in so doing it actuates the dog $k^7$ and swings it on its fulcrum $k^{10}$, causing the wire $i$ to be nipped between the outer end of the dog $k^7$ and the lip or jaw $k^9$ of the lever $k^8$, and the continued movement of the lever $k^4$ causes the lever $k^8$ to swing on its fulcrum $k^5$ and to feed the wire held between the lip $k^9$ and dog $k^7$ the distance required according to the length of nail used. A spring, $l$, having one of its ends attached to the outer end of the lever $k^8$ and its other end attached to any stationary part of the plate $a'$, returns the nipper-levers to their original positions when the cam $k$ ceases to act. The return movement of the nipper-levers and consequent amount of feed of the wire are regulated by means of an adjustable cam or incline, $m$, adapted to be turned around its axis upon a stud or pin secured to the plate $a'$, and provided with a friction-spring, $m'$, to hold it in position when adjusted. A stop-bar, $m''$, arranged in guides on the plate $a'$, has its rear end resting against the face of the cam $m$, and its forward end serves as a stop against the nipper-lever $k^8$ to limit its backward motion caused by the spring $l$. While the wire is being cut, pointed, and headed it is essential that it should be held firmly in position, and for this purpose we make use of an automatic clamping device constructed as follows: To the driving-shaft $b$ is secured a cam, $n$, that actuates a lever, $n'$, pivoted at $n''$ to a post or projection, $n^3$, on the plate $a'$, as shown in Figs. 13 and 14. Said lever $n'$ has its other end inserted in a slotted opening, $n^4$, in the rod $n^5$, which latter is provided with a regulating-screw, $n^6$, and check-nut $n^7$, for the purpose of properly adjusting the throw of said rod $n^5$ and consequent clamping-pressure on the wire $i$. The lower end of the rod $n^5$ is pivoted at $n^8$ to the clamping-lever $n^9$, which latter is pivoted at $n^{10}$ to the plate $a'$, as shown in Fig. 14.

$a''$ is a hardened steel plate secured to the top of plate $a'$, and between it and the free end of the lever $n^9$ the wire $i$ is firmly clamped by the action of the cam $n$ on the lever $n'$ during the time the wire is being cut. The plate $a''$ has its forward end terminating in close proximity to the main deliverer $h$, as shown in Fig. 2, and is there provided with a vertical enlargement or curved lip, $a^3$, which, in connection with the cutter or shearing blade, serves to bend or point the under side of the nail-wire while it is being cut, as will hereinafter be described.

The device for automatically cutting the wire, pointing and heading it, is carried out as follows: On the shaft $b$ is secured the cam $o$, that actuates the lever $o'$, (shown in Fig. 11,) which lever is secured in a suitable manner to the rock-shaft $o''$, located in bearings attached to the plate $a'$. The said lever $o'$ is actuated by the cam $o$ against the influence of the spring $o^3$, Fig. 11, which returns the lever $o'$ to its normal position (shown in said Fig. 11) when the cam $o$ ceases to act on it. To the forward end of the rock-shaft $o''$ is secured the crank $o^4$, (shown in Fig. 2,) and to said crank is pivoted the upper end of the inclined bar $o^5$. To the under side of said bar $o^5$ is firmly secured, by means of the clamp $o^6$ and its screw $o^7$, the cutter-bar $o^8$, which is pressed against the stationary incline $o^9$ by means of the influence of the spring $o^{10}$, one end of which is secured to the plate $a'$, and its free end pressing on top of the bar $o^5$, as shown in Figs. 1 and 2.

The operation of the cutting device is as follows: After the wire $i$ has been fed into the perforation in the nail-deliverer $h$ by the feeding device, as described, it is firmly clamped and held in position by the aforesaid clamping device. The blade $o^8$ now advances toward the nail-deliverer $h$, and its sharp lower end slices off the wire, causing its under side to crowd against the lip $a^3$ on the plate $a''$, by which the centrally-bent point $i'$ in Fig. 15 is formed on the main portion of the wire, and a turned-over head, $i''$ in Fig. 15, formed on the severed nail by the action of the end of the blade $o^8$ against the circumference of the nail-deliverer $h$, and so on. For the purpose of preventing the nail from shaking out of the nail-deliverer $h$ while the latter carries it to a vertical position below the driver, we use a spring, $p$, (shown in Fig. 2,) that is secured to the nail-tube block and has its free end pressing against the outer periphery of the nail-deliverer $h$, as shown.

We prefer to make a graduated scale on the cam $m$, as shown in Fig. 2, and to make a corresponding graduated scale, $a^4$, on the plate $a'$, so as to set and adjust the said cam $m$ according to the length of nails that are to be cut off from the wire $i$.

During the operation of the machine the shoe-sole to be nailed is held by hand against the lower end of the nail-tube, or, if so desired, the shoe may be secured on a jack of any desired construction without departing from the essence of our invention.

The operation of this our improved nailing-machine is as follows: When the driver is in its highest position, the nail-deliverer $h$ is turned around its axis, so that its nail-receiving perforation comes opposite to the wire $i$. The latter is then fed into such perforation, and after being fed the required distance it is clamped by the clamping mechanism, and while so clamped it is cut off, pointed, and headed, after which the nail-deliverer is automatically turned, so that its perforation is vertically in a line with and below the driver, when the latter descends and drives the nail into the boot or shoe sole held below the nail-tube, and so on.

Having thus fully described the nature, construction, and operation of our invention, we wish to secure by Letters Patent and claim—

1. In a nailing-machine, the mechanism, as described, for imparting a rotary motion to the driving-shaft $b$, consisting of the drum $c$, loosely mounted on said shaft and having radially-movable friction-clutch blocks $b^5$ $b^5$ and their connecting-springs $b^7$ $b^7$, combined with the disk $b'$, secured to said shaft $b$ and having the levers $b^3$ $b^3$ pivoted to said disk, and the longitudinally-movable cone $d$, journaled on the driving-shaft and having connecting mechanism to the treadle rod $e^5$, as and for the purpose set forth.

2. In a nailing-machine, the nail-feeding device, as described, consisting of the rock-lever $k^4$, automatically operated from the shaft $b$ and pivoted to the bed of the machine, combined with the lever $k^8$, pivoted in its rear end at $k^5$, and having jaw or lip $k^9$ and spring $l$ in its outer end, and having the dog $k^7$ pivoted to it, as and for the purpose set forth.

3. In a nailing-machine, the nipper-lever $k^4$ and the automatic mechanism, as described, consisting of the cam $k$, secured to the driving-shaft $b$, the bell-crank lever $k'$, and the link $k^3$, connecting said bell-crank lever with the rear end of the nipper-lever $k^4$, as and for the purpose set forth.

4. In a nailing-machine, the clamping-lever $n^9$, for the purpose of holding the wire while it is being cut, pointed, and headed, combined with the mechanism for its automatic operation, consisting of the cam $n$, secured to the driving-shaft $b$, the lever $n'$, pivoted at $n''$, as described, and the slotted rod $n^4$ $n^5$, provided with regulating-screw $n^6$ and having its lower end connected to the clamping-lever $n^9$, as and for the purpose set forth.

5. In a nailing-machine, the inclined reciprocating cutter-bar $o^9$ and connecting mechanism to the driving-shaft, as described, consisting of the cam $o$ on the driving-shaft, the spring-pressed lever $o'$, mounted on the rock-shaft $o''$, the cranks $o^4$, secured to said rock-shaft, and the bar $o^5$, pivoted to said crank $o^4$ and having clamping device for securing it to the cutter-bar $o^9$, as and for the purpose set forth.

6. In a nailing-machine, the reciprocating and spring-actuated nipper feed-levers $k^4 k^7 k^8$, in combination with the adjustable and graduated cam-disk $m$ and the rod or bar $m''$, bearing against such cam and having its forward end adapted to serve as a stop to limit the return motion of the said nipper levers, as set forth.

7. In a nailing-machine, the inclined reciprocating cutter $o^9$, adapted to yield upward against the influence of the spring $o^{10}$, combined with the oscillating nail-deliverer $h$ and the bed or plate $a''$, having the lip or rise $a^3$ on its upper side, adjacent to the deliverer $h$, for the purpose of centering the nail-point $i$ relative to the nail-body, as and for the purpose set forth.

In testimony whereof we have signed our names to this specification, in the presence of two subscribing witnesses, on this 6th day of August, A. D. 1887.

JOHN P. SMITH.
WARREN C. EVANS.

Witnesses:
WM. P. MOULTON,
JOHN F. BROWN.